Sept. 13, 1960  R. A. NELSON  2,952,167
VARIABLE SPEED TRANSMISSION

Original Filed June 13, 1953  2 Sheets-Sheet 1

ROY A. NELSON
INVENTOR.

BY *[signature]*

ATTORNEY

Sept. 13, 1960 R. A. NELSON 2,952,167
VARIABLE SPEED TRANSMISSION
Original Filed June 13, 1953 2 Sheets-Sheet 2

ROY A. NELSON
INVENTOR.

BY *Herbert J. Brown*
ATTORNEY

United States Patent Office 2,952,167
Patented Sept. 13, 1960

2,952,167

VARIABLE SPEED TRANSMISSION

Roy A. Nelson, 904 E. Lovers Lane, Arlington, Tex.

Refiled for abandoned application Ser. No. 591,054, June 13, 1953. This application Oct. 28, 1957, Ser. No. 693,226

3 Claims. (Cl. 74—689)

This invention relates generally to speed and torque transmitting devices, and more particularly to a transmission having infinitely variable speeds.

The primary object of this invention is to provide a combination of pulley belt and differential spider drive transmission having selectively variable intermediate speeds.

Another object of this invention is to provide a pulley belt transmission of the type described which is capable of delivering a reverse speed output without the customary reverse gear ratio.

The object of one embodiment is to provide an infinitely variable intermediate speed transmission including an infinitely variable reverse speed ratio without employing any gear driven parts.

An object of another embodiment is to provide a rigid belt drive for the pulley section of a transmission of this type.

An additional object is to provide an infinitely variable speed transmission which includes a unique belt retainer assembly to provide the necessary take up and movement when using a rigid ring shaped belt.

A still further object of this invention is to provide an extremely compact transmission and one which is rugged and durable in operation and yet which includes an accurate and delicate control mechanism.

And yet another object of this invention is to provide a speed transmission device of the type described having an extremely rapidly operated manual control for changing the speeds in finite increments.

These and other objects will be apparent from an examination of the following specification and drawings, in which.

Figure 1:
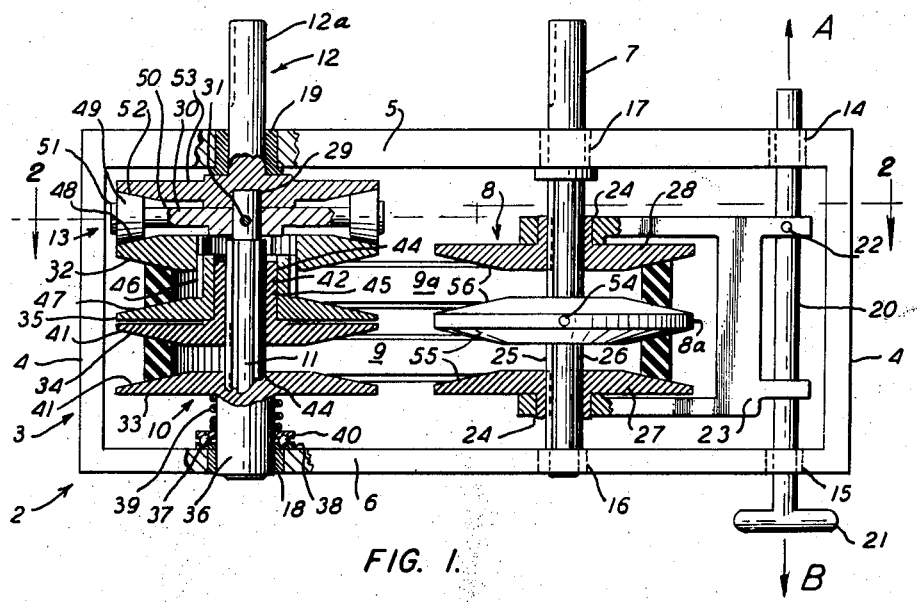
Figure 1 represents a top plan view of the transmission device of this invention partially in cross section and showing the pulleys in position for a 1:1 ratio drive.
Figure 2:
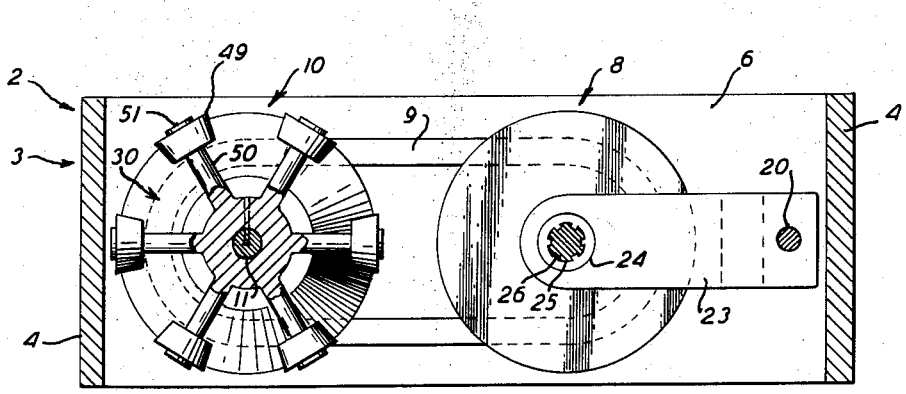
Figure 2 is a side elevational view in cross section taken along the lines 2—2 of Figure 1.

Referring now more particularly to the characters of reference in the drawing, it will be observed in Figures 1 and 2 that the first embodiment of this invention, referred to generally at 2, consists basically of: a housing or frame 3 having side walls 4 which are parallel and identical and front and rear end walls 5 and 6 respectively which are parallel but not identical, an input shaft 7 including a pulley assembly 8 which is operatively connected by flexible belts 9 and 9a to an aligned pulley assembly 10 on intermediary shaft 11 which shaft is connected to and drives an output shaft structure 12 by the operation of a spider drive indicated generally at 13.

Examining the basic machine structures in more detail, the housing 3 is seen to be bored to receive bushings 14-19 to receive their corresponding shafts, i.e., shifter shaft 20 operates in slidable relation to bushings 14 and 15; input shaft 7 rotates in bushings 16 and 17; whereas intermediary shaft 11 is rotatably supported at one end in bushing 18, and stub shaft 12a is rotatably supported in bushing 19.

The shifter shaft 20 includes a handle 21 at the shaft end adjacent the operator, and shaft 20 is pin connected as at 22 to a control yoke 23 which is journalled at 24 to pulley assembly 8.

Input shaft 7 includes external splines 25 which slidably engage internal splines 26 of pulley assembly 8 and this spline arrangement permits the two sliding pulley members 27 and 28 to be moved longitudinally on shaft 7 toward the center or fixed pulley half 8a in response to movement of shifter yoke 23.

Intermediary shaft 11 extends from rear wall 6 to a termination just short of front wall 5, whereat the end 29 is turned down to form a bearing surface by which the shaft is journalled into output shaft structure 12. A spider 30 which forms part of spider drive 13 is connected to shaft 11 adjacent end 29 by means of pin 31. Other elements on shaft 11 include pulley assembly 10 which may be broken down into the separable parts of outer non-sliding pulley halves 32 and 33 and inner sliding pulley halves 34 and 35. Outer pulley half 33 includes a relatively large hollow hub 36 which is journalled in bearing 18 for both rotary and linear sliding movement relative to the I.D. of bearing 18 and the O.D. of shaft 11. A thrust bearing 37 surrounds the hub 36 and abuts the inner side of rear wall 6 on its fixed race 38, and engages the anchor end of compression spring 39 on its opposite and movable race 40. By this arrangement of parts, pulley half 33 will be spring loaded to take up any slack in belts 9 and 9a caused by movement of shifter yoke 23. Spring 39 is sufficiently strong that it will cooperate with the tapered surfaces 41 of pulley halves to cause belt 9 to move outward on the tapers and effectively increase the diameter of the belt pulley comprised of pulley halves 33 and 34.

Pulley half 34 includes an elongated hub 42 which is internally splined to engage external splines 43 of shaft 11. The external surface of hub 42 is machined to provide a bearing surface 44 for the internal surface of hub 45 of pulley half 35, the external surface of hub 45 in turn being splined as at 46 to engage internal splines of pulley half 32. Pulley halves 35 and 32 include opposite inward facing tapered surfaces 47 which likewise cooperate with the tapered surfaces of belt 9a to either increase or decrease the effective diameter of the pulley made up of halves 32 and 35.

The opposite side of pulley half 32 from taper 47 is also tapered as at 48 to receive rollers 49 which are in turn journalled on machined spokes 50 of spider 30. Rollers 49 are retained in the axial position on spokes 50 by means of an enlarged end cap 51. On the side of spider 30 opposite from pulley half 32, the rollers 49 engage the tapered surfaces 52 of disk 53 which together with stub shaft 12a forms the output shaft structure 12.

Pulley assembly 8 includes the fixed pulley half 8a which is connected to and rotates with shaft 7 by virtue of the connecting pin 54 and each sliding pulley half 27 and 28 include opposed tapered surfaces 55 and 56 respectively for a similar function to that described for pulley assembly 10.

Figure 6:
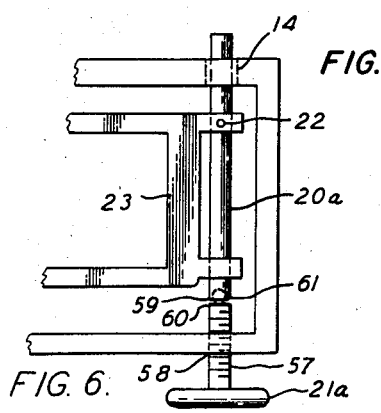
Figure 6 is a fragmentary detail view of a threaded shifter mechanism which may be employed in either embodiment of this invention.

To facilitate movement of shifter yoke 23 in smaller increments and with more force to overcome sliding resistance and other friction, a short threaded shaft section 57, as shown in Figure 6, may be inserted between the shifter shaft 20a and the handle 21a, and the bushing 15 will be replaced by a threaded hole 58. Adjacent ends 59 and 60 of shafts 20a and 57 respectively are connected by the means of a swivel ball joint 61 so that rotation of handle 21 will provide longitudinal movement to shaft 20a and consequently shifter yoke 23 without imparting any rotary movement to shaft 20a.

The operation of the embodiment shown in Figures 1, 2, and 6 when the effective diameters of each pair of pulleys for belts 9 and 9a are the same will result in an input shaft to output shaft ratio of 1:1 or a direct speed ratio drive, since in this instance the spider drive 13 functions the same as it would if pulley half 32 and output shaft structure disk 53 were bolted together. However, as soon as the operator moves shifter shaft 20 one way or the other, an increased or decreased speed is transmitted to the output shaft through the unique speed transmission mechanism hereinbefore described. As handle 21, for instance, is moved toward the front wall 5, as in the direction of arrow A, pulley half 28 separates away from the adjacent side of pulley half 8a and pulley belt 9a is free to move inward toward shaft 7 by virtue of the tapered surfaces 56 on the pulley halves and the corresponding tapered sides of belt 9a; this inward movement toward shaft 7 is brought about by the urging of spring 39 which causes the tapered sides of belt 9a to move out along the diameter of the pulley halves 32 and 35 which are tending to close due to spring 39 and the fact that the end of belt 9a between pulley halves 28 and 8a is now free to move. As that portion of belt 9a between halves 28 and 8a is moving inward toward shaft 7 (and thus decreasing the effective diameter), that portion of belt 9 between pulley halves 27 and 8a is moving outward away from shaft 7 (and thus increasing its effective diameter) due to the direction of movement of shaft 20 and shifter yoke 23.

When the effective diameters of each pulley set is thus established, it will be observed in Figure 1 that an input r.p.m. applied to shaft 7 will increase the speed of the pulley sets nearest rear wall 6, i.e., pulley halves 27—8a via belts 9 to pulley halves 33—34 and this increased speed will be applied to intermediary shaft 11 and consequently spider drive 13. And the same input r.p.m. will transmit a slower speed via belt 9a to pulley halves 32—35. Since rollers 49 of spider drive 13 rotate at a resultant speed determined by both the speed of shaft 11 and the speed of pulley half 32, it will be apparent that the resultant speed of disk 53 and consequently output shaft 12a will depend upon the relationship of the effective diameters of all of the pulley halves involved and therefore on the position of shifter yoke 23. It will be observed that when shifter shaft 20 and yoke 23 are moved in the direction of B, the pulley made up of halves 32—35 will be traveling faster than spider 30 and the transmitted r.p.m. to output shaft 12a will be in a reverse direction than that of the input shaft 7 when the pulley speed exceeds twice the speed of the spider.

Figure 3:
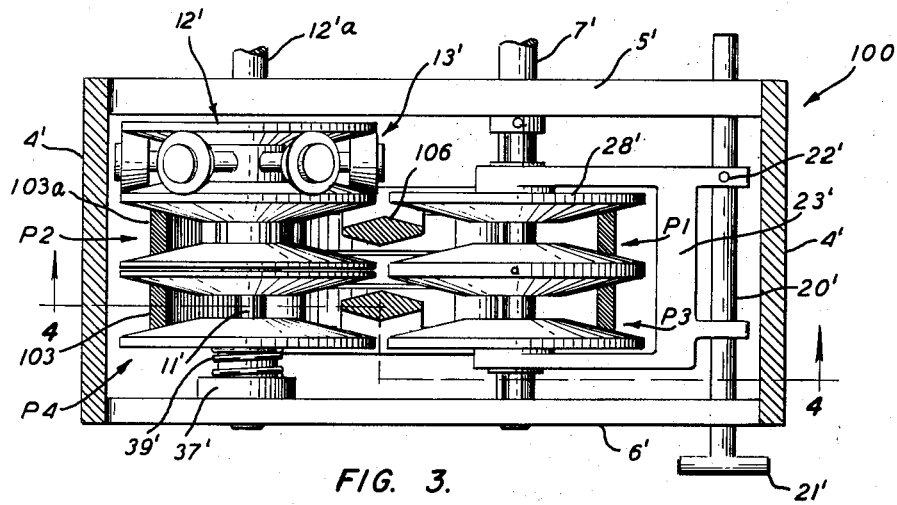
Figure 3 represents a top plan view of another embodiment of this invention taken in cross section along the lines 3—3 of Figure 4.
Figure 4:
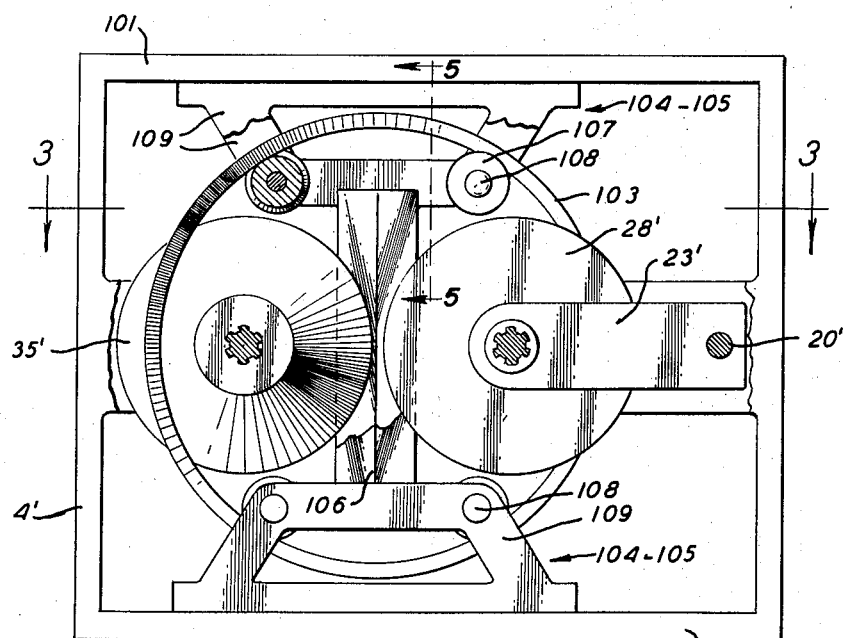
Figure 4 is a side elevational view of the second embodiment of this invention taken in cross section along the lines 4—4 of Figure 3.
Figure 5:
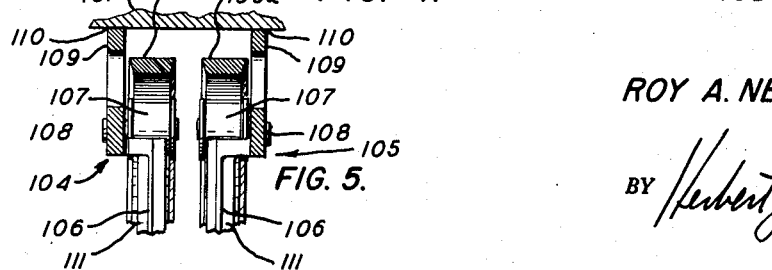
Figure 5 is a fragmentary section taken along the lines 5—5 of Figure 4 and showing details of the rigid belt retainer employed in this second embodiment.

Referring now to the embodiment shown in Figures 3–5, it will be noted that corresponding parts of this embodiment for the most part are the prime number of the original reference number used in the embodiment of Figures 1, 2 and 6. Since the major distinction between this and the first embodiment lies in the rigid belt structure, the belt retainer, and the housing, and only these parts will be described in detail.

The housing 100 of Figures 3 and 4 is enclosed having side walls 4', a front wall 5', rear wall 6', and parallel upper and lower walls 101 and 102. For clarity of description in this embodiment the pulley sets made up of the pulley halves described in thorough detail in Figures 1 and 2 will be identified here as P1, P2, P3 and P4, each aligned pair being connected operatively by a rigid ring shaped belt 103 and 103a. A pair of opposed belt retainer structures 104 for belt 103 are rigidly connected by struts 106 but are free to slide along the inner surfaces of their corresponding walls 101 and 102.

A similar pair of belt retainer structures 105 are installed to accommodate rigid belt 103a. Each belt retainer includes guide rollers 107 for its belt and rollers 107 are journalled on shafts 108 supported from the outer walls 109 of the U-shaped truss frame of the retainer structure. The distal edge 110 of retainers 104 and 105 makes a sliding contact engagement with the walls 101 and 102.

The operation of the embodiment shown in Figures 3–6 corresponds to the operation previously described for the first embodiment with the exception that the outward and inward movement of the belts 9 and 9a to change the effective pulley diameters is replaced by a corresponding movement of the rigid belts 103 and 103a and an accompanying sliding movement of belt retainer structures 104 and 105. Connecting struts 106 include bevelled sides 111 so that its movement will not interfere with the operation of pulleys P1–P4.

From the foregoing description it will be readily seen that there has been produced a device which substantially fulfills the objects of the invention as set forth herein.

The invention is not limited to the exemplary constructions herein shown and described, but may be made in many ways within the scope of the appended claims.

What is claimed is:

1. A variable speed transmission comprising a frame, an input shaft rotatably mounted in said frame, an intermediary shaft also mounted in said frame and parallel with said input shaft, an output shaft rotatably mounted in said frame in axial alignment with said intermediary shaft and rotatable independently thereof, a disk on said output shaft adjacent said intermediary shaft, a fixed pulley member on said input shaft, sliding pulley members on said input shaft on opposite sides of said fixed pulley member and comprising first and second drive pulleys, means moving said sliding pulley members in unison longitudinally on said input shaft, a pulley assembly on said intermediary shaft and including first and second driven pulleys respectively opposite and generally coplanar with said first and second drive pulleys, the said second driven pulley being comprised of pulley member halves independently splined on said intermediary shaft, and said first driven pulley being comprised of a pulley member half freely and rotatably supported around said intermediary shaft, and a pulley member half splined with the first mentioned pulley member half of said first driven pulley, a spider fixedly secured on said intermediary shaft between said disk and said first driven pulley, rollers on said spider making direct rolling contact with said first driven pulley and said disk, spring means urging all said pulley halves on said intermediary shaft in a direction toward said output shaft, opposing surfaces of all said pulley members and pulley halves being convergingly tapered toward their axial centers, and belts connecting the respectively aligned said drive and driven pulleys.

2. A variable speed transmission as defined in claim 1, and wherein said means moving said sliding pulley members in unison is comprised of a shifter shaft mounted for longitudinal movement in said frame parallel with said input shaft, and a yoke secured to said shifter shaft, the arms of said yoke contacting the outer ends of said sliding pulley members.

3. A variable speed transmission as defined in claim 1, and wherein said belts are comprised of rigid rings substantially V-shaped in cross section so that the sides thereof at least generally conform with the opposing tapered surfaces of said pulleys.

References Cited in the file of this patent

UNITED STATES PATENTS

| | | | |
|---|---|---|---|
| 1,574,620 | Gill | Feb. 23, | 1926 |
| 2,299,921 | Myers | Oct. 27, | 1942 |
| 2,646,696 | Kepes | July 28, | 1953 |
| 2,714,825 | Ferrari | Aug. 9, | 1955 |
| 2,755,683 | Ryan | July 24, | 1956 |
| 2,760,386 | Southwick | Aug. 28, | 1956 |
| 2,774,254 | Gerber | Dec. 18, | 1956 |

UNITED STATES PATENT OFFICE
CERTIFICATION OF CORRECTION

Patent No. 2,952,167            September 13, 1960

Roy A. Nelson

It is hereby certified that error appears in the above numbered patent requiring correction and that the said Letters Patent should read as corrected below.

In the drawings, Sheets 1 and 2, upper left-hand corner, and in the heading to the printed specification, lines 4 and 5, for the filing date, "June 13, 1953", each occurrence, read -- June 13, 1956 --.

Signed and sealed this 25th day of April 1961.

(SEAL)
Attest:

ERNEST W. SWIDER
Attesting Officer

DAVID L. LADD
Commissioner of Patents